(12) United States Patent
Münz et al.

(10) Patent No.: US 9,897,988 B2
(45) Date of Patent: Feb. 20, 2018

(54) METHOD, CONTROLLER, AND COMPUTER PROGRAM PRODUCT FOR CONTROLLING A VOLTAGE IN A POWER GRID

(71) Applicant: SIEMENS AKTIENGESELLSCHAFT, München (DE)

(72) Inventors: Ulrich Münz, München (DE); Rudolf Sollacher, Eching (DE)

(73) Assignee: Siemens Aktiengesellschaft, München (DE)

( * ) Notice: Subject to any disclaimer, the term of this patent is extended or adjusted under 35 U.S.C. 154(b) by 314 days.

(21) Appl. No.: 14/871,519

(22) Filed: Sep. 30, 2015

(65) Prior Publication Data
US 2016/0094031 A1    Mar. 31, 2016

(30) Foreign Application Priority Data

Sep. 30, 2014 (EP) ..................... 14187096

(51) Int. Cl.
G05B 15/02 (2006.01)
H02J 3/00 (2006.01)
(Continued)

(52) U.S. Cl.
CPC ............... *G05B 15/02* (2013.01); *H02J 3/06* (2013.01); *H02J 3/382* (2013.01);
(Continued)

(58) Field of Classification Search
CPC ... G05B 15/02; H02J 3/06; H02J 3/382; H02J 2003/007; Y02E 10/563; Y02E 60/76; Y04S 40/22
See application file for complete search history.

(56) References Cited

U.S. PATENT DOCUMENTS

| | | | |
|---|---|---|---|
| 9,342,059 B2 * | 5/2016 | Sun | H02J 3/16 |
| 2014/0046500 A1 * | 2/2014 | Varma | G05F 1/66 700/298 |
| 2017/0025859 A1 * | 1/2017 | Garcia | H02J 3/16 |

OTHER PUBLICATIONS

Dimitrovski, Aleksandar, and Kevin Tomsovic. "Uncertainty in load flow modeling: Application of the boundary load flow." Automation of Electric Power Systems: Special Issue on Developments in Load Flow and Optimal Power Flow Techniques 29.16 (2005): 6-15.*

(Continued)

*Primary Examiner* — Jennifer L Norton
(74) *Attorney, Agent, or Firm* — Lempia Summerfield Katz LLC

(57) ABSTRACT

For controlling a voltage in a power grid including a PV bus and a PQ bus, a first tolerance range for an active power of the PV bus and a second tolerance range for an active power of the PQ bus are received. A first value for a reactive power of the PQ bus is received. With that, a robust optimization process is run for a set of power flow equations. The first and second tolerance ranges and the first reactive power value are input to the robust optimization process using the first and second tolerance ranges as robust optimization uncertainty. With that, the robust optimization process determines a voltage set point for the PV bus so that the set of power flow equations is fulfilled for the first and second tolerance ranges. According to the determined voltage set point, a voltage at the PV bus is controlled.

17 Claims, 2 Drawing Sheets

(51) Int. Cl.
*H02J 3/06* (2006.01)
*H02J 3/38* (2006.01)

(52) U.S. Cl.
CPC ....... *H02J 2003/007* (2013.01); *Y02E 10/563* (2013.01); *Y02E 60/76* (2013.01); *Y04S 40/22* (2013.01)

(56) References Cited

OTHER PUBLICATIONS

European Office Action for related European Application No. 14187096.4-1804, dated Feb. 9, 2015.
T. Kyriakidis, R. Cherkaoui, and M. Kaya, "A DC power flow extension" in "4th IEEE PES Innovative Smart Grid Technologies (ISGT) Europe," 2013.
Wikipedia; "Slack Bus", Wikipedia, freie Enzeklopädie, pp. 1-3, URL:http://en.wikipedia.~rg/wiki/Slack_bus, XP055165601, 2014.

\* cited by examiner

US 9,897,988 B2

METHOD, CONTROLLER, AND COMPUTER PROGRAM PRODUCT FOR CONTROLLING A VOLTAGE IN A POWER GRID

This application claims the benefit of EP 14187096.4, filed on Sep. 30, 2014, which is hereby incorporated by reference in its entirety.

BACKGROUND

In contemporary power grids for transmission and/or distribution of electrical power, it becomes increasingly complex to control the voltage of the various buses of the power grid. This is at least partially due to the increase of renewable power supply, which leads to faster power flow variations and reverse power flow from distribution grids to transmission grids.

Usually, a voltage control is to fulfill several requirements. First, the voltage of PQ buses (e.g., buses where the voltage cannot be controlled directly) may be within predetermined voltage limits Examples for PQ buses are load buses or buses with renewable power supply. Second, the voltage of PV buses (e.g., buses where the voltage level can be controlled directly) may be close to a nominal voltage value. Examples for PV buses are generator buses with conventional generators or buses with on-load tap changer (OLTC) transformers, reactive power compensators, flexible AC transmission systems (FACTS), or DC power grid terminals. These requirements may be fulfilled even in case of fast power variations of, for example, a renewable power supply. Hence, the voltage control may allow for a fast re-optimization after significant power flow variations, even for large power grids.

Known methods for voltage control in a power grid include methods based on numerically solving a set of nonlinear power flow equations, which combine values for active powers, reactive powers, voltage amplitudes and phase angles of the PV buses and the PQ buses of the power grid. It is known to solve these power flow equations for the voltage amplitudes at the PQ buses by inputting the values for the active and reactive power supply and demand at the PQ buses and the active power supply and demand and voltage amplitude at the PV buses. These input values are measured or estimated (e.g., based on predetermined load profiles). According to known methods, the optimal voltage levels at the PV buses are not determined directly but rather by an iterative solution of the power flow equations for different voltage levels. This often implies time consuming calculations. The dependence on estimated or varying values for the active and reactive power supply and demand leads to a significant increase of numerical complexity.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method, a controller, and a computer program product for controlling a voltage in a power grid that are more flexible, for example, in cases of varying or uncertain power flows are provided.

According to one or more of the embodiments, a method, a controller, and a computer program product for controlling a voltage in a power grid including a PV bus and a PQ bus are provided. The controller and/or the computer program product may be central instances for the power grid or distributed over several communicating instances. A first tolerance range for an active power of the PV bus and a second tolerance range for an active power of the PQ bus are received. The tolerance ranges may be represented as intervals defined by minimum and maximum values of the respective quantities. A first value for a reactive power of the PQ bus is received. With the received first value for the reactive power of the PQ bus, a robust optimization process is run by a processor for a set of power flow equations combining values for active powers, reactive powers, and voltages of the PV bus and the PQ bus.

Robust optimization methods are a particular class of optimization methods allowing for uncertain parameters. The robust optimization methods specifically allow the optimization of first quantities satisfying given constraints for a whole domain of uncertain second quantities. The constraints are often denoted as robust optimization constraints, and the domain of uncertain second quantities is often denoted as uncertainty or robust optimization uncertainty.

According to one or more of the present embodiments, the first and second tolerance range and the first reactive power value are input to the robust optimization process using the first and second tolerance ranges as robust optimization uncertainty. With that, the robust optimization process determines a voltage set point for the PV bus so that the set of power flow equations is fulfilled for the first and second tolerance ranges. According to the determined voltage set point, a voltage at the PV bus is controlled.

Because one or more of the present embodiments use tolerance ranges for a robust optimization process instead of given or estimated power grid parameters, the voltage set point may be determined in compliance with the tolerance ranges even if a power supply and/or consumption is not known precisely or shows fast variations. For example, one or more of the present embodiments allow a fast and flexible determination and optimization of the voltage set point, thus allowing an efficient voltage control of the PV bus with a short reaction time.

According to an embodiment, a third tolerance range for a voltage of the PQ bus may be received and input to the robust optimization process as a robust optimization constraint. With that, the voltage set point may be determined so that the robust optimization constraint is satisfied for the first and second tolerance ranges.

According to a further embodiment, a nominal value for a voltage of the PQ bus may be received and input to the robust optimization process, taking a difference between the nominal value and an actual voltage of the PQ bus into account in a robust optimization cost function. With that, the voltage set point may be determined so that the robust optimization cost function is minimized for the first and second tolerance ranges.

According to an embodiment, a deviation of the voltage set point from a nominal voltage of the PV bus may be minimized by the robust optimization process. This allows minimizing fluctuations of the voltage at the PV bus, thus enhancing voltage stability.

According to an embodiment, the first tolerance range may be received from a conventional power generator or a high voltage direct current (HVDC) terminal at the PV bus. The second tolerance range and the first reactive power value may be received from a renewable power generator or a load device at the PQ bus.

The voltage set point may be transmitted to a conventional power generator, a high voltage direct current terminal, and/or a flexible AC transmission system (e.g., a static VAR compensator) at the PV bus.

The set of power flow equations may include a linearized power flow equation.

For a transmission grid, the linearization of the linearized power flow equation may be based on neglecting a resistance of a power line of the transmission grid compared to an inductivity of the power line. A phase angle difference between neighboring buses may be linearized.

For a distribution grid, the linearization of the linearized power flow equation may be based on neglecting a deviation of a voltage value from a nominal voltage of the PV bus or PQ bus compared to a voltage difference between neighboring buses. A phase angle difference between neighboring buses may be linearized.

With the above linearizations, the power flow equations may be simplified considerably. This allows a fast and stable numerical solution even in case of a very large power grid.

The robust optimization process may be a linear robust optimization process based on a linear programming routine. Linear programming routines allow a particular fast and stable numerical solution of constrained optimization problems. The robust optimization process may be efficiently distributed over several processors.

DETAILED DESCRIPTION

Figure 1:
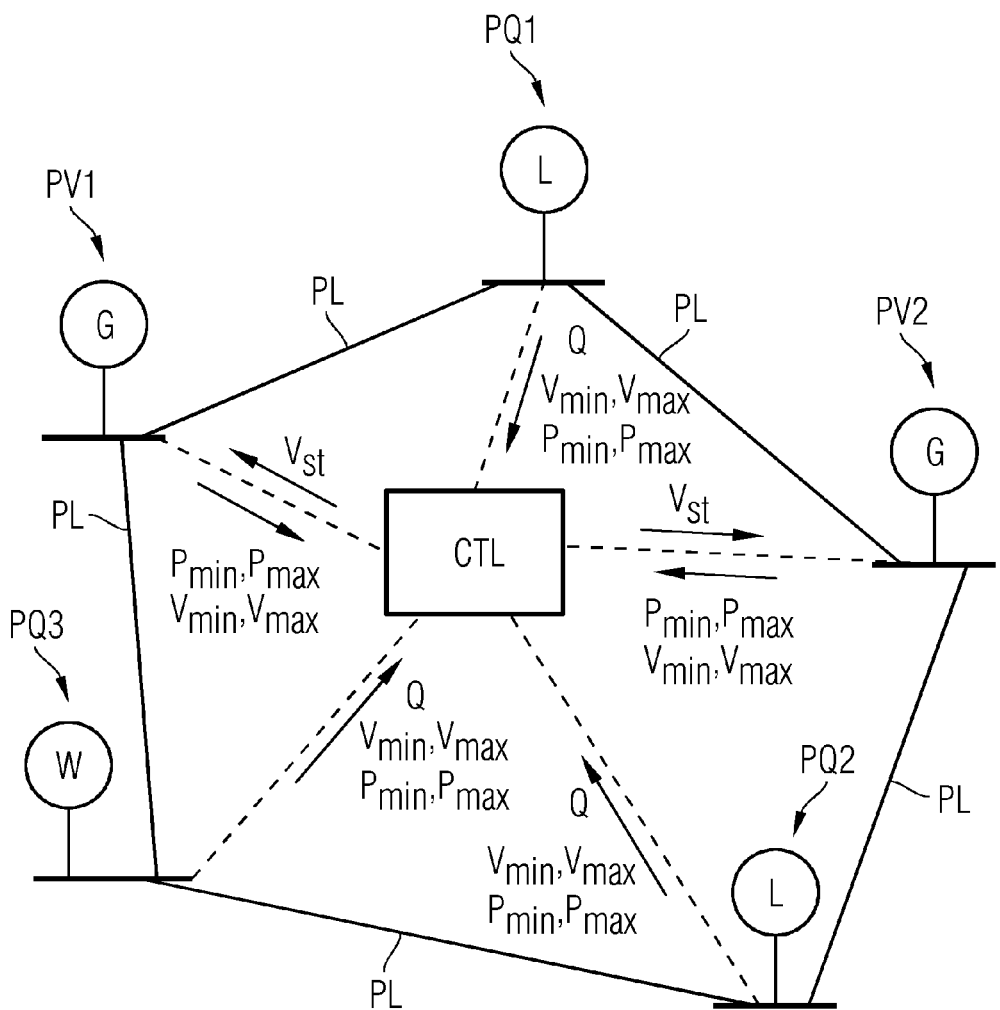
FIG. 1 shown one embodiment of a power grid with a number of PV buses and a number of PQ buses.

FIG. 1 shows an exemplary embodiment of a power grid with several PV buses PV1, PV2 and several PQ buses PQ1, PQ2, and PQ3 in schematic representation. According to this embodiment, the PV buses PV1 and PV2 are generator buses with conventional power generators G. One of the PV buses PV1 or PV2 may be treated as a slack bus for computation purposes. The PQ buses PQ1 and PQ2 are load buses with load devices L, while the PQ bus PQ3 is a bus with a renewable power supply W (e.g., a wind generator). The PV buses PV1 and PV2 and the PQ buses PQ1 . . . PQ3 are connected by power lines PL.

For controlling voltages of the conventional power generators G of the PV buses PV1 and PV2, a controller CTL is provided in the power grid. The controller CTL is coupled to the PV buses PV1 and PV2, as well as to the PQ buses PQ1 . . . PQ3, as indicated by dashed lines in FIG. 1.

From each of the buses PV1, PV2, PQ1 . . . PQ3, the controller CTL receives a minimum value $P_{min}$ and a maximum value $P_{max}$ for the active power supplied or consumed by the respective power generator or load device of the respective bus. The controller CTL receives from each of the buses PV1, PV2, PQ1 . . . PQ3 a minimum value $v_{min}$ and a maximum value $v_{max}$ for a voltage of the respective bus. The minimum and maximum values $v_{min}$ and $v_{max}$ may alternatively be provided by a grid code of the power system. For each bus, the values $P_{min}$ and $P_{max}$ specify a tolerance range for the active power of that bus, and the values $v_{min}$ and $v_{max}$ specify a tolerance range for the voltage of that bus.

The controller CTL receives from each of the PQ buses PQ1 . . . PQ3 a value Q for the reactive power of the respective PQ bus. The reactive power value Q may also be a vector (e.g., a pair of parameters denoting a range such as a tolerance range for the reactive power of the respective PQ bus). This may be the case when controlling the voltage of PV buses in distribution grids according to the second embodiment described below.

The controller CTL inputs the received tolerance ranges specified by the $P_{min}$, $P_{max}$, $v_{min}$, and $v_{max}$ for each bus and the received reactive power values Q for the PQ buses into a robust optimization process for a set of power flow equations, as described in detail below. The robust optimization process outputs a respective optimized voltage set point $v_{st}$ for each of the PV buses PV1 and PV2 so that the robust optimization constraints are satisfied. Each of the respective voltage set points $v_{st}$ is transmitted to the respective power generator G of the respective PV bus PV1 or PV2 in order to control respective voltages.

A common network model of a power grid represents a power line between two power grid buses $B_i$ and $B_k$ by a complex series impedance $\underline{z}_{ik}=r_{ik}+j*x_{ik}$ and complex shunt admittance $\underline{c}_{ik}=j*b_{ik}$. The complex shunt admittance is equally split between adjacent buses.

Figure 2:
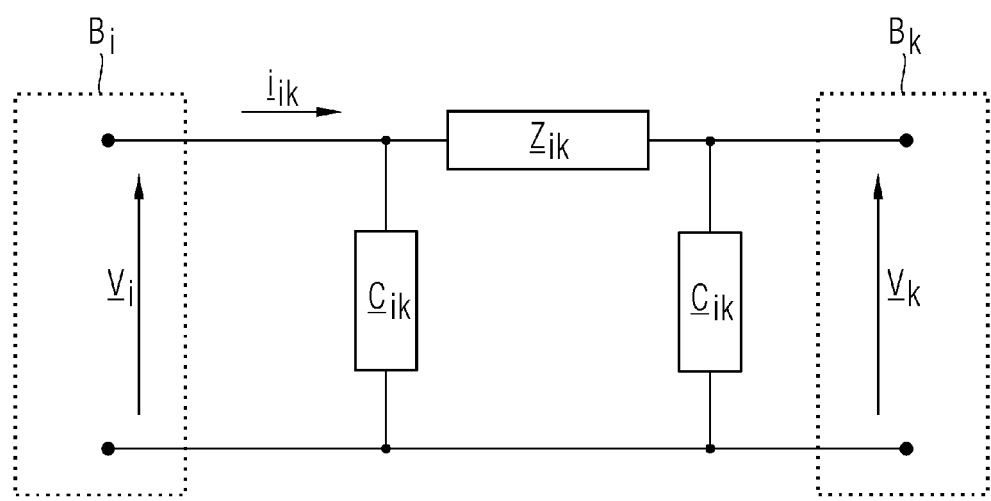
FIG. 2 shows one embodiment of a branch model representing a connection between two buses.

Here and in the following, the imaginary unit is denoted by "j". FIG. 2 shows a schematic representation of a line or branch model with complex node voltages $\underline{v}_i=v_i*\exp(j*\theta_i)$ at bus $B_i$ and $\underline{v}_k=v_k*\exp(j*\theta_k)$ at bus $B_k$, and complex current $\underline{i}_{ik}=(\underline{v}_i-\underline{v}_k)/\underline{z}_{ik}$ flowing from bus $B_i$ to adjacent bus $B_k$.

$\theta_i$ and $\theta k$ denote the phases of the voltages $\underline{v}_i$ and $\underline{v}_k$ at the buses $B_i$ and $B_k$, respectively. The $r_{ik}$, $x_{ik}$, $b_{ik}$, $v_i$, $v_k$, $\theta_i$, and $\theta_k$ are considered real, while the $\underline{z}_{ik}$, $\underline{v}_i$, $\underline{v}_k$, and $\underline{c}_{ik}$ are considered complex quantities. In the following, the buses $B_i$ and $B_k$ are often denoted by index i or k, respectively.

The apparent power $S_{ik}$ flowing from bus i bus to bus k is given by:

$$S_{ik}=P_{ik}\pm j*Q_{ik}=\underline{v}_i*\underline{i}_{ik}^*, \qquad (1)$$

where the raised "*" denotes complex conjugation.

This leads to the known alternating current (AC) power flow equations for a power grid with N buses:

$$S_i = P_i + jQ_i = \sum_{k \in N_s} S_{ik} = \sum_{k \in N_s} \left[ \frac{\underline{v}_i(\underline{v}_i^* - \underline{v}_k^*)}{\underline{z}_{ik}^*} - \frac{\underline{v}_i\underline{v}_i^* jb_{ik}}{2} \right] \qquad (2a)$$

$$P_i = \sum_{k \in N_s} \left[ v_i^2 \frac{r_{ik}}{r_{ik}^2+x_{ik}^2} - \frac{v_i v_k}{r_{ik}^2+x_{ik}^2}(r_{ik}\cos(\theta_i-\theta_k)x_{ik}\sin(\theta_i-\theta_k)) \right] \qquad (2b)$$

$$Q_i = \sum_{k \in N_s} \left[ v_i^2\left(\frac{x_{ik}}{r_{ik}^2+x_{ik}^2} - \frac{b_{ik}}{2}\right) - \frac{v_i v_k}{r_{ik}^2+x_{ik}^2}(x_{ik}\cos(\theta_i-\theta_k) + r_{ik}\sin(\theta_i-\theta_k)) \right] \qquad (2c)$$

The power flow equations are a set of nonlinear equations combining characteristic quantities of the power grid. The sum includes all neighboring buses k connected to bus i by a power line. $S_i$, $P_i$, and $Q_i$ denote the net apparent power, active power, and reactive power, respectively, generated at bus i.

There are three types of buses: slack bus s, with $v_s=1$ and $\theta_s=0$, provides the missing active power and reactive power in order to balance the power flow equations (s denotes the index of the slack bus); PV bus i, with $P_i=P_{*i}$ and $v_i=v_{*i}$ for given $P_{*i}$, $v_{*i}$ (e.g., a generator bus); and PQ bus k, with $P_k=P_{*k}$ and $Q_k=Q_{*k}$ for given $P_{*k}$, $Q_{*k}$ (e.g., a load bus).

A power grid may contain a number of generator buses, all of which are PV buses except for one that is the slack bus. Typically, all load buses are PQ buses.

According to prior art, the power flow equations are usually solved to provide a solution on Q, θ for the PV buses, with $P_*$, $v_*$ given, and v, θ for the PQ buses with $P_*$, $Q_*$ given. Q, θ, $P_*$, $v_*$, v, θ, $P_*$, $Q_*$ denote the vectors of the corresponding indexed quantities.

With one or more of the present embodiments, in contrast, the following question is considered.

Given a power grid with one slack bus, $N_G-1$ PV buses, and $N_L$ PQ buses with uncertain active power loads or generators $P_{*n}$ with $P_{*n\ min}<=P_{*n}<=P_{*n\ max}$, how should the voltages $v_{*i}$ at the PV buses be tuned such that the voltages $v_k$ at the PQ buses satisfy $v_{k\ min}<=v_k<=v_{k\ max}$?

The intervals FP $[P_{*n\ min}, P_{*n\ max}]$ denote tolerance ranges or uncertainties for the active powers $P_{*n}$ of the PV and PQ buses. The above question defines a robust optimization problem. Robust optimization problems are a particular known class of optimization problems allowing for uncertain parameters. Robust optimization problems specifically allow the optimization of first quantities (e.g., the voltages $v_{*i}$) of the PV buses, satisfying given constraints (e.g., the voltages $v_k$ of the PQ buses) for a whole domain of uncertain second quantities (e.g., the active power loads $P_{*n}$ of PV and PQ buses). The constraints are often denoted as robust optimization constraints, and the domain of uncertain second quantities may be denoted as uncertainty or robust optimization uncertainty.

According to a first exemplary embodiment, the power grid includes a transmission grid. In transmission grids, the power lines are mainly inductive (e.g., $x_{ik} \gg r_{ik}$). Therefore, the power flow equations (2b) may be simplified to $$P_i = \sum_{k \in N_s} \left[ \frac{v_i v_k}{x_{ik}} \sin(\theta_i - \theta_k) \right] \quad (3)$$

which may be further simplified into direct current (DC) power flow equations using $\sin(x) \approx x$ for small phase differences $|\theta_i - \theta_k|$:

$$P_i = \sum_{k \in N_s} \left[ \frac{v_i v_k}{x_{ik}} (\theta_i - \theta_k) \right] \quad (4)$$

or in vector form $$P = H\theta, \quad (5)$$

where P, θ are the vectors of $P_i$, $\theta_i$, respectively, and H is a Laplacian matrix with off-diagonal elements $-(v_i*v_k)/x_{ik}$ and $$\sum_{k \in N_s} \frac{v_i v_k}{x_{ik}}$$

on the diagonal. Apparently, H has an eigenvalue 0 and is therefore not invertible. Yet, if $1^T P = 0$ is satisfied, then $\theta = H \pm P$ solves (5) for given P, where $H^+$ is the pseudo-inverse of H.

For the PV buses as well as for the PQ buses, the active power is given by P. Since the power lines are purely inductive, there is no active power loss in the transmission grid, and therefore, the active power supply of the slack node may be obtained from $1^T P = 0$. If $P_*$ is defined as an $N_G + N_L - 1$ dimensional vector (e.g., as a vector with one dimension less than P) with one element for each PV and PQ bus, then $$P = M P_* = \begin{pmatrix} -1^T \\ \mathbb{I} \end{pmatrix} P_*, \quad (6)$$

where $\mathbb{I}$ is the identity matrix. For the phase angles, the following is obtained $$\theta = H^\dagger M P_*. \quad (7)$$

In order to determine estimates of the voltages at the PQ buses, a result from the paper "A DC power flow extension," by T. Kyriakidis, R. Cherkaoui, and M. Kaya, in 4th IEEE PES Innovative Smart Grid Technologies (ISGT) Europe, 2013 may be used. That P-inv approximation is based on the DC power flow (5) assuming mainly inductive power lines to estimate the voltage phase angles. Then, the voltage levels at all buses are estimated based on an approximated AC power flow considering both inductive and resistive parameters of the power lines. This condition states $$A_P \delta v = b_P, \quad (8)$$

where $\delta v = v - v_b$ is the absolute offset of the voltage at each bus from a base voltage $v_b$. This base voltage is $v_*$ for PV and slack buses (e.g., $\delta v = 0$ for those buses), and the base voltage corresponds to the reference voltage for PQ buses.

The other parameters are $$A_P = G^+ + diag(P^+) \quad (9)$$

$$b_P = P^+ + G^+ v_b, \quad (10)$$

where $P^+$ is a vector with elements $P^+_i = P_i * \cos + \theta_i + Q_i * \sin \theta_i$, and $G^+$ is a matrix with elements $G^+_{ik} = G_{ik} * \cos \theta_k + B_{ik} * \sin \theta_k$, where $G_{ik} = r_{ik}/(r_{ik}^2 + x_{ik}^2)$ and $B_{ik} = -x_{ik}/(r_{ik}^2 + x_{ik}^2)$. These equalities are approximated for small phases $|\theta_i|$, as follows $$G_{ik}^+ \approx G_{ik} + B_{ik} \theta_k \quad (11)$$

$$P_i^+ \approx P_i + Q_i \theta_i. \quad (12)$$

A further linearization may be used around typical values for $\theta_i$, which leads to more accurate results of the phase angles $\theta_i$. The phase angles $\theta_i$ may be different from zero, but the variation of the $\theta_i$ depending on $P_*$ may be assumed to be small. Thus, (8) is rewritten using (7) and (6) in the following form $$(G + B\text{diag}(H^\dagger M P_*) + \text{diag}(M P_* + \text{diag}(H^\dagger M P_*)Q))\delta e = \quad (13)$$
$$M P_* + \text{diag}(H^\dagger M P_*)Q - (G + B\text{diag}(H^\dagger M P_*))v_b.$$

Coming back to the question above, $v_*$ of the PV buses is replaced with $v_b + \Delta v$, where $v_b$ is the reference or base voltage, and $\Delta v$ is an offset to be tuned. Thus, the following is obtained:

$$\underbrace{(G + B\text{diag}(H^\dagger M P_*) + \text{diag}(\mathbb{I} + \text{diag}(Q)H^\dagger)M P_*))}_{A(P_*)} \delta v = \quad (14)$$
$$\underbrace{(\mathbb{I} + \text{diag}(Q)H^\dagger)M P_* - (G + B\text{diag}(H^\dagger M P_*))v_b + \Delta v)}_{b(P_*, \Delta v)}.$$

This equality constraint contains the known parameters G, B, H, M, and $v_b$. The δv of the PQ buses is to be determined.

For these lines in (14), the elements of Q only depend on the PQ buses. Thus, also the relevant elements of Q are known. The uncertain vector $P_*$ enters linearly in the equation, and the uncertainty is constrained by a convex polytope. Therefore, all admissible vectors $P_*$ may be investigated by analyzing a finite set of corner points of the convex polytope. The control variables $\Delta v$ and the constraint output variables $\delta v$ enter linearly in the constraint. Therefore, the above relation leads to a linear programming problem that may be solved easily using standard solution algorithms like interior-point methods or the known simplex algorithm.

The above acts may be summarized in the following exemplary linear programming problem that minimizes the largest voltage offset $\Delta v$ of all PV buses.

$$\min_{\Delta v} \|\Delta v\|_\infty \tag{15a}$$

$$\text{s.t. } v_b + A(P_*)^{-1} b(P_*, \Delta v) < v_{max} \forall\, P_* \in \{P_{min}, P_{max}\} \tag{15b}$$

$$v_b - A(P_*)^{-1} b(P_*, \Delta v) < v_{min} \forall\, P_* \in \{P_{min}, P_{max}\}, \tag{15c}$$

where $\|\cdot\|_\infty$ denotes the infinity norm (e.g., the maximal absolute value), and $\{P_{min}, P_{max}\}$ specifies the corner points of the polytope that encloses all admissible $P_*$. As usual, the abbreviation "s.t." is "such that" and denotes the constraints of the minimization.

According to a second exemplary embodiment, the power grid includes a distribution grid. In contrast to transmission grids according to the first embodiment, the power lines may not be assumed to be purely inductive in distribution grids. With the power lines, the ratio $r_{ik}/x_{ik}$ may even be close to 1 or above 1.

For distribution grids, the AC power flow equations (2) are the starting point. The $r_{ik}/x_{ik}$ ratio is described by the phase of the complex impedance $z_{ik}=r_{ik}+j*x_{ik}=z_{ik}*\exp(j*\Phi_{ik})$, where $\Phi_{ik}=\tan(x_{ik}/r_{ik})$. It follows that $r_{ik}/(r_{ik}^2+x_{ik}^2)=\cos(\Phi_{ik})/z_{ik}$ and $x_{ik}/(r_{ik}^2+x_{ik}^2)=\sin(\Phi_{ik})/z_{ik}$.

The following is obtained:

$$\begin{pmatrix} P_i \\ Q_i \end{pmatrix} = v_i \sum_{k \in N_s} \frac{1}{z_{ik}} \begin{pmatrix} \sin\phi_{ik} & \cos\phi_{ik} \\ -\cos\phi_{ik} & \sin\phi_{ik} \end{pmatrix} \begin{pmatrix} v_k \sin(\theta_i - \theta_k) \\ v_i - v_k \cos(\theta_i - \theta_k) \end{pmatrix}. \tag{16}$$

In order to find an appropriate solution of (16), the following simplifications are advantageous. The phase differences are rather small (e.g., it may be assumed that $\sin(\theta_i-\theta_k)\approx\theta_i-\theta_k$ and $\cos(\theta_i-\theta_k)\approx 1$). The variation of the voltages $v_i$ is negligible compared to the voltage differences between adjacent buses (e.g., $v_i-v_k$ dominates the variation of the individual $v_i$). This allows some voltages to be replaced by a nominal voltage $v_N$ (e.g., it may be assumed that $v_i \approx v_N$). The shunt capacitors of the power lines may be neglected (e.g., $b_{ik}\approx 0$). Because of this assumption, the reactive power for the shunt capacitors may be added to $Q_i$ as additional constant reactive power load.

With the above simplifications, a linearized power flow equations may be derived $$\begin{pmatrix} P_i \\ Q_i \end{pmatrix} = v_N \sum_{k \in N_s} \frac{1}{z_{ik}} \begin{pmatrix} \sin\phi_{ik} & \cos\phi_{ik} \\ -\cos\phi_{ik} & \sin\phi_{ik} \end{pmatrix} \begin{pmatrix} v_N(\theta_i - \theta_k) \\ v_i - v_k \end{pmatrix}. \tag{17}$$

The active power part of this linearized power flow equation falls back to the DC power flow equation for purely inductive powerlines (e.g., $\Phi_{ik}=\pi/2$). However, these equations are also valid for distribution grids. Note that the above simplifications have turned the power grid into a loss-less power grid model because the active and reactive power flowing into each power line is equal to the power flow that leaves this power line at the other end.

Equation (16) may be rewritten in matrix form $$\begin{pmatrix} P \\ Q \end{pmatrix} = v_N \begin{pmatrix} Bv_N & G \\ -Gv_N & B \end{pmatrix} \begin{pmatrix} \theta \\ v \end{pmatrix}, \tag{18}$$

where G is a matrix with elements $-g_{ik}=-r_{ik}/(r_{ik}^2+x_{ik}^2)=-\cos(\Phi_{ik})/z_{ik}$ on the off-diagonal and $\Sigma_{k\in N_i}g_{ik}$ on the diagonal.

Similarly, B is a matrix with elements $-b_{ik}=-x_{ik}/(r_{ik}^2+x_{ik}^2)=-\sin(\Phi_{ik})/z_{ik}$ on the off-diagonal and $\Sigma_{b\in N_i}b_{ik}$ on the diagonal.

B and G are symmetric matrices and satisfy $1^T B = B*1 = 0$ and $1^T G = G*1 = 0$. Hence, B and G are not invertible, but $1^T P = 0$ and $1^T Q = 0$ is fulfilled. This shows again that the above power grid model is loss-less.

Coming back to the question above, we consider a power grid with one slack bus, $N_G-1$ PV buses, and $N_L$ PQ buses. Without loss of generality, it may be assumed that the first bus (i=1) is the slack bus (e.g., $\theta_1=0$ and $P_1=-\Sigma_{i=2}^N P_i$), the buses 2 to $N_G$ are PV buses, and buses $N_G+1$ to $N=N_G+N_L$ are PQ buses. With this assumption, the first row and the first column of (18) may be removed in order to obtain $$\begin{pmatrix} \breve{P} \\ Q \end{pmatrix} = v_N \begin{pmatrix} \breve{B}v_N & \breve{G} \\ -\breve{G}^T v_N & B \end{pmatrix} \begin{pmatrix} \breve{\theta} \\ v \end{pmatrix}, \tag{19}$$

where $\breve{P}=\text{vec}(P_2, \ldots, P_N)$, $\breve{\theta}=\text{vec}(\theta_2, \ldots, \theta_N)$, $\breve{B}$ corresponds to B with the first row and column removed, and $\breve{G}$ corresponds to G with the first row removed. Now, $\breve{B}$ is invertible, which may be shown, for example, using Gershgorin's disc theorem. Thus, Schur complement may be used to remove $\breve{\theta}$ from the above equation system and get $$v_N(B + \breve{G}^T \breve{B}^{-1} \breve{G}) \begin{pmatrix} v_G \\ v_L \end{pmatrix} = \begin{pmatrix} Q_G \\ Q_L \end{pmatrix} + \breve{G}^T \breve{B}^{-1} \breve{P}, \tag{20}$$

where v is separated into the known elements of the slack and PV buses $v_G$ and the unknown values of the PQ buses $v_L$. Similarly, Q is split into the unknown elements of the slack and the PV buses $Q_G$ and the known values of the PQ buses $Q_L$. Since there is interest in the unknown $v_L$ but less interest in the unknown $Q_G$, only the last $N_L$ equations, where $\breve{P}$ and $Q_L$ is known and $v_G$ is to be optimized in order to achieve $v_{min} \leq v_L \leq v_{max}$, may be considered. Since both $\breve{P}$ and $Q_L$ enter linearly, the constraint may be extended to a design constraint for $v_G$, $Q_L$, and $\breve{P}$ or a robust constraint for uncertain $Q_L$ and $\breve{P}$.

The above procedure related to distribution grids according to the second embodiment may be summarized in the following exemplary linear programming problem that minimizes the largest voltage offset $v_G-v_N*1$ from the nominal voltages $v_N$ of all PV buses.

$$\min_{v_G} \|v_G - v_N 1\|_\infty \tag{21a}$$

$$\text{s.t.} \quad \{(B + \ddot{G}^T \hat{B}^{-1} \ddot{G})\}_{22}^{-1} \tag{21b}$$

$$\left(-\{(B + \ddot{G}^T \hat{B}^{-1} \ddot{G})\}_{12} v_G + \frac{1}{v_N}(Q_L + \{\ddot{G}^T \tilde{B}^{-1}\}_2 \check{P})\right) <$$

$$v_{max} \forall \check{P} \in \{P_{min}, P_{max}\}, Q_L \in \{Q_{min}, Q_{max}\}$$

$$\{(B + \ddot{G}^T \hat{B}^{-1} \hat{G})\}_{22}^{-1} \tag{21c}$$

$$\left(-\{(B + \tilde{G}^T \tilde{B}^{-1} \tilde{G})\}_{12} v_G + \frac{1}{v_N}(Q_L + \{\ddot{G}^T \tilde{B}^{-1}\}_2 \check{P})\right) >$$

$$v_{min} \forall \check{P} \in \{P_{min}, P_{max}\}, Q_L \in \{Q_{min}, Q_{max}\},$$

where $\{P_{min}, P_{max}\}$ and $\{Q_{min}, Q_{max}\}$ denote the corner points of the polytope that encloses all admissible $\check{P}$ and Q. For a matrix X, the notation $\{X\}_{12}$ and $\{X\}_{22}$ specifies the lower left $N_L*N_G$ and lower right $N_L*N_L$ block of the matrix X, and $\{X\}_2$ denotes the lower $N_L*N$ block of the matrix X.

The embodiments as described above illustrate the advantages of the invention. For example, one or more of the present embodiments allow for a direct optimization of the controllable voltage levels, an incorporation of uncertain active and reactive power supply and demand, and a formulation as a linear programming problem. This allows for a fast solution even for a great number of optimization variables.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling a voltage in a power grid, the power grid comprising a PV bus and a PQ bus, the method comprising:
   receiving a first tolerance range for an active power of the PV bus and a second tolerance range for an active power of the PQ bus;
   receiving a first value for a reactive power of the PQ bus;
   running, by a processor, a robust optimization process for a set of power flow equations combining values for active powers, reactive powers, and voltages of the PV bus and the PQ bus;
   inputting the first tolerance range, the second tolerance range, and the first reactive power value to the robust optimization process using the first tolerance range and the second tolerance range as robust optimization uncertainty;
   determining, by the robust optimization process, a voltage set point for the PV bus so that the set of power flow equations is fulfilled for the first tolerance range and the second tolerance range; and
   controlling a voltage at the PV bus according to the determined voltage set point.

2. The method of claim 1, further comprising:
   receiving a third tolerance range for a voltage of the PQ bus; and
   inputting the third tolerance range to the robust optimization process as a robust optimization constraint,
   wherein the voltage set point is determined so that the robust optimization constraint is satisfied for the first tolerance range and the second tolerance range.

3. The method of claim 1, further comprising:
   receiving a nominal value for a voltage of the PQ bus; and
   inputting the nominal value to the robust optimization process taking a difference between the nominal value and an actual voltage of the PQ bus into account in a robust optimization cost function,
   wherein the voltage set point is determined so that the robust optimization cost function is minimized for the first tolerance range and the second tolerance range.

4. The method of claim 1, wherein the robust optimization process minimizes a deviation of the voltage set point from a nominal voltage of the PV bus.

5. The method of claim 1, wherein the first tolerance range is received from a conventional power generator or a high voltage direct current terminal at the PV bus, the second tolerance range and the first reactive power value are received from a renewable power generator or a load device at the PQ bus, or a combination thereof.

6. The method of claim 1, further comprising transmitting the voltage set point to a conventional power generator, a high voltage direct current terminal, a flexible AC transmission system at the PV bus, or any combination thereof.

7. The method of claim 1, wherein the set of power flow equations comprises a linearized power flow equation.

8. The method of claim 7, wherein for a transmission grid, a linearization of the linearized power flow equation is based on neglecting a resistance of a power line of the transmission grid compared to an inductivity of the power line, linearizing a phase angle difference between neighboring buses, or a combination thereof.

9. The method of claim 7, wherein for a distribution grid, a linearization of the linearized power flow equation is based on neglecting a deviation of a voltage value from a nominal voltage of the PV bus or the PQ bus compared to a voltage difference between neighboring buses, linearizing a phase angle difference between neighboring buses, or a combination thereof.

10. The method of claim 1, wherein the robust optimization process is a linear robust optimization process based on a linear programming routine.

11. A controller for controlling a voltage in a power grid, the power grid comprising a PV bus and a PQ bus, wherein the controller is configured to:
   receive a first tolerance range for an active power of the PV bus and a second tolerance range for an active power of the PQ bus;
   receive a first value for a reactive power of the PQ bus;
   run a robust optimization process for a set of power flow equations combining values for active powers, reactive powers, and voltages of the PV bus and the PQ bus;
   input the first tolerance range, the second tolerance range, and the first reactive power value to the robust optimization process using the first tolerance range and the second tolerance range as robust optimization uncertainty;
   determine, by the robust optimization process, a voltage set point for the PV bus so that the set of power flow equations is fulfilled for the first tolerance range and the second tolerance range; and control a voltage at the PV bus according to the determined voltage set point.

12. A computer program product comprising a non-transitory computer-readable storage medium, the non-transitory computer-readable storage medium storing instructions executable by one or more processors for controlling a voltage in a power grid, the power grid comprising a PV bus and a PQ bus, the instructions comprising:

receiving a first tolerance range for an active power of the PV bus and a second tolerance range for an active power of the PQ bus;

receiving a first value for a reactive power of the PQ bus;

running, by a processor, a robust optimization process for a set of power flow equations combining values for active powers, reactive powers, and voltages of the PV bus and the PQ bus;

inputting the first tolerance range, the second tolerance range, and the first reactive power value to the robust optimization process using the first tolerance range and the second tolerance range as robust optimization uncertainty;

determining, by the robust optimization process, a voltage set point for the PV bus so that the set of power flow equations is fulfilled for the first tolerance range and the second tolerance range; and controlling a voltage at the PV bus according to the determined voltage set point.

13. The computer program product of claim 12, wherein the instructions further comprise:

receiving a third tolerance range for a voltage of the PQ bus; and inputting the third tolerance range to the robust optimization process as a robust optimization constraint, wherein the voltage set point is determined so that the robust optimization constraint is satisfied for the first tolerance range and the second tolerance range.

14. The computer program product of claim 12, wherein the instructions further comprise:

receiving a nominal value for a voltage of the PQ bus; and inputting the nominal value to the robust optimization process taking a difference between the nominal value and an actual voltage of the PQ bus into account in a robust optimization cost function, wherein the voltage set point is determined so that the robust optimization cost function is minimized for the first tolerance range and the second tolerance range.

15. The computer program product of claim 12, wherein the robust optimization process minimizes a deviation of the voltage set point from a nominal voltage of the PV bus.

16. The computer program product of claim 12, wherein the first tolerance range is received from a conventional power generator or a high voltage direct current terminal at the PV bus, the second tolerance range and the first reactive power value are received from a renewable power generator or a load device at the PQ bus, or a combination thereof.

17. The computer program product of claim 12, wherein the instructions further comprise transmitting the voltage set point to a conventional power generator, a high voltage direct current terminal, a flexible AC transmission system at the PV bus, or any combination thereof.

* * * * *